April 25, 1961 G. P. ADAMS 2,981,129
CABLE COILING, CUTTING AND STRIPPING APPARATUS
Filed April 20, 1959 2 Sheets-Sheet 1

INVENTOR
G. P. ADAMS
BY
H. J. Winegar
ATTORNEY

April 25, 1961  G. P. ADAMS  2,981,129
CABLE COILING, CUTTING AND STRIPPING APPARATUS
Filed April 20, 1959  2 Sheets-Sheet 2
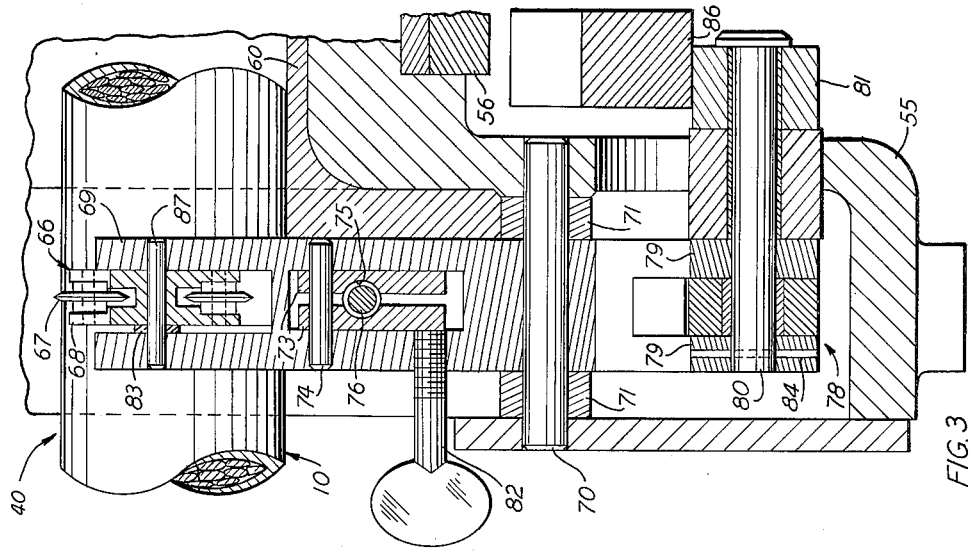
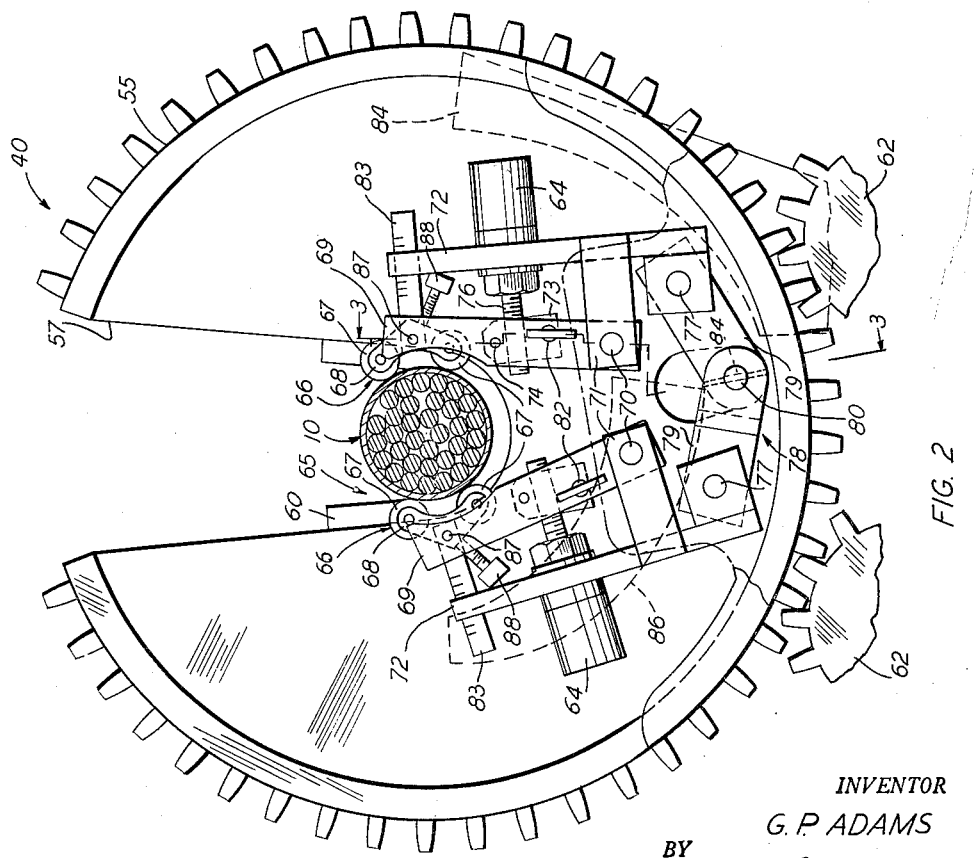
INVENTOR
G. P. ADAMS
BY
ATTORNEY

United States Patent Office 2,981,129
Patented Apr. 25, 1961

2,981,129

CABLE COILING, CUTTING, AND STRIPPING APPARATUS

George P. Adams, Baltimore, Md., assignor to Western Electric Company, Incorporated, New York, N.Y., a corporation of New York Filed Apr. 20, 1959, Ser. No. 807,603

3 Claims. (Cl. 81—9.51)

The present invention relates to improvements in apparatus for coiling and cutting a sheathed cable, and stripping a portion of the sheath from the cable adjacent to one end thereof. The invention relates more particularly, although not exclusively, to improved devices for cutting the sheath of a cable circumferentially thereof adjacent to one end thereof without cutting the cable core.

In the manufacture of terminal-stub cables for the communications industry, a portion of a sheathed cable of a definite length is wrapped in a coil and a portion of the sheath adjacent to one end of a relatively straight portion thereof is stripped from the cable core. The portion of the cable core from which the sheath is stripped is connected subsequently to a terminal assembly. The stub cable is used to splice the terminal assembly to a distribution cable in the communications field.

An object of the present invention is to provide improved apparatus for coiling and cutting a sheathed cable and for stripping a portion of the sheath from the cable adjacent to one end thereof.

Another object of the present invention is to provide improved apparatus in which several coils are formed from an indefinite length of sheathed cable, and portions of the sheath adjacent to one end of each of the coils are stripped therefrom.

A further object of the present invention is to provide a cutting device which may be used to sever the sheath of the cable circumferentially thereof adjacent to one end of each of the coils to permit portions of the sheath adjacent to the ends of the cables to be stripped therefrom.

A still further object of the present invention is to provide a new and improved sheath-cutting device.

Apparatus for coiling and cutting a sheathed cable and for stripping a portion of the sheath from adjacent to one end thereof which embody certain principles of the present invention may include an improved means for cutting the sheath circumferentially of the cable without cutting the cable core. The cutting means may include a pair of arms mounted pivotally and adjustably with respect to the cable and designed to be revolved therearound. The cutters may be mounted rotatably on pivoted arms. When the arms and cutters are revolved around the cable, cam means may be utilized to cause the arms to pivot through a toggle action so that the cutters sever the sheath and are retracted therefrom in a single revolution.

Other objects and features of the present invention will be more readily understood from the following detailed description of a specific embodiment thereof, when read in conjunction with the accompanying drawings, in which:

Fig. 2 is an enlarged, fragmentary, vertical section of the apparatus of Fig. 1, taken along line 2—2 thereof, illustrating a sheath-cutting device thereof, and Fig. 3 is a fragmentary, irregular section of the cutting device of Fig. 2, taken along line 3—3 thereof.

Figure 1:
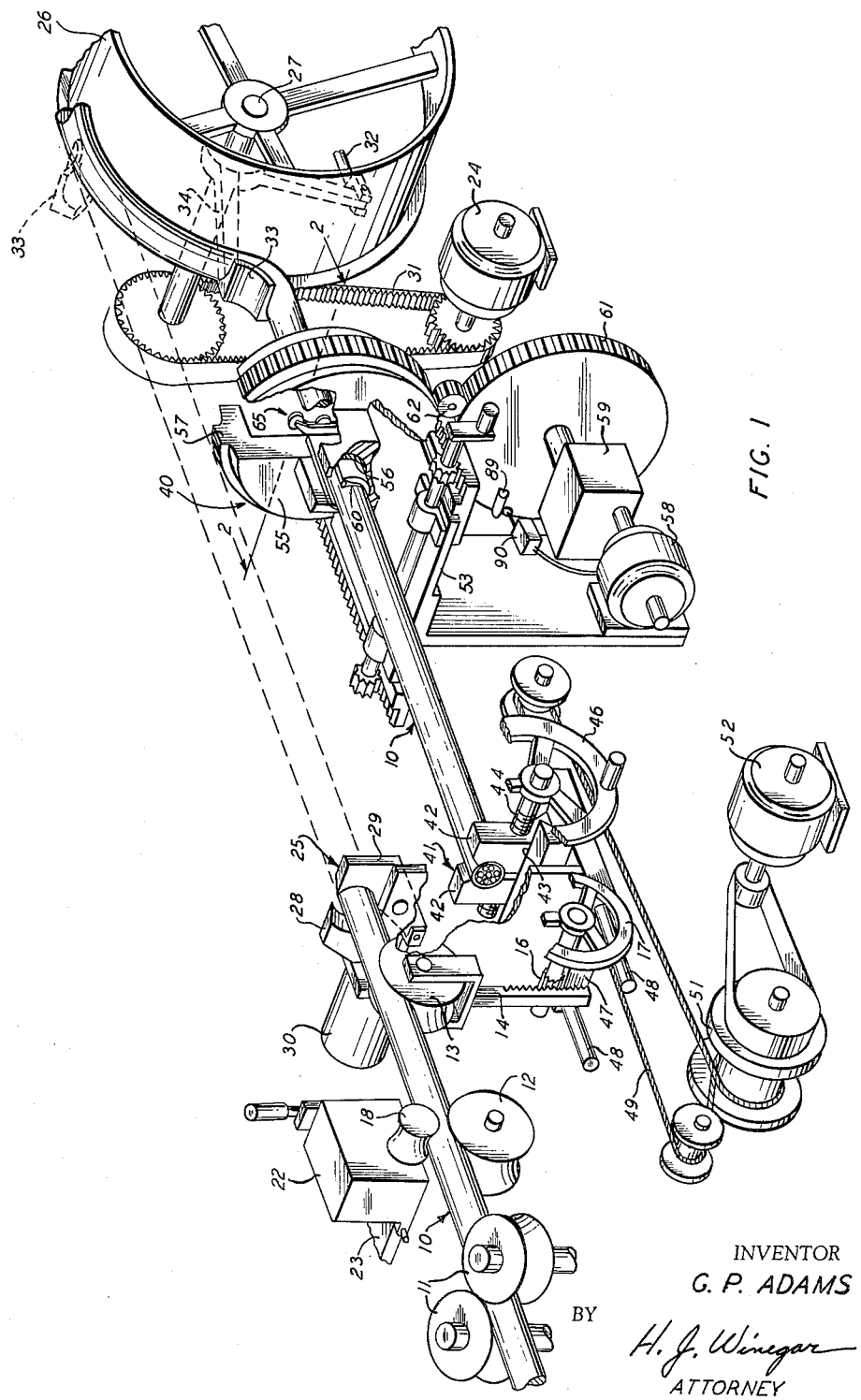
Fig. 1 is a fragmentary, perspective, diagrammatic view of an apparatus for coiling and cutting a sheathed cable and stripping a portion of the sheath from adjacent to one end thereof to form a terminal stub.

Referring now to the drawings, and more particularly to Fig. 1 thereof, there is shown a relatively stiff, lead-sheathed cable 10 having a paper-wrapped core made up of a plurality of insulated conductors. The cable 10 has been inserted manually through a pair of rollers 11—11 over a roller 12 and a supporting roller 13. The supporting roller 13 is adjustable vertically by means of a rack 14 and a pinion 16. The pinion 16 is rotatable by a hand wheel 17.

A roller 18 engages the sheath of the cable 10 and is rotated thereby to acuate a measuring device 22. The roller 18 is mounted rotatably on the measuring and control device 22 which, in turn, is mounted pivotally to a member 23 to permit cables 10—10 of various sizes to be measured by the device 22. The cable is passed from the supporting roller 13 through a shearing device, designated generally by the numeral 25, and is secured to a tapered winding drum 26 by appropriate means (not shown). The winding drum 26 is mounted rotatably on a shaft 27 and is driven by a motor 24 through geared pulleys by means of a toothed belt 31. After the cable 10 has been secured to the drum 26, the drum is rotated by the motor 24. The duration of operation of the motor 24 is controlled by the measuring and control device 22 through an appropriate control circuit (not shown). After a predetermined length of the cable 10 has been wound on the drum 26, the motor stops and the cable 10 may then be severed by manually actuating the shearing device 25. It will be understood, however, that the control circuit may be utilized to actuate the shearing device 25 just subsequent to stopping the winding drum 26.

The shearing device 25 includes a fixed blade 28 and a movable blade 29. The movable blade 29 is secured to a piston rod of a piston-cylinder assembly 30. When the piston-cylinder assembly 30 is actuated, the rod thereof is forced to the right, as viewed in Fig. 1, to close the cutting blades 28 and 29 and completely sever the portion of the cable 10 therebetween.

An arm 34 is mounted pivotally on the shaft 27 and is acutatable by a piston rod 32 of a piston-cylinder assembly (not shown) secured thereto. A curved, cam member 33 is secured to the free end of the arm 34 and is positioned in contact with the portion of the cable 10 extending outwardly from the last convolution of the coiled portion of the cable 10 on the drum 26. As the arm 34 is operated in a counterclockwise direction, as viewed in Fig. 1, the free end of the cable 10, which has been severed, will be bent downwardly and partially around the drum 26. The arm 34 and attached cam 33 are then locked in a downward position by means of a latching mechanism (not shown). After the cable 10 has been severed and the free end of the portion thereof extending from the drum 26 has been pushed downwardly by the arm 34 and attached cam member 33, the free end is placed manually in a cutting device, designated generally by the numeral 40, and is clamped in a clamping device, designated generally by the numeral 41.

The clamping device 41 includes a pair of jaws 42—42 mounted slidably along a guideway 43. The jaws 42—42 are actuated simultaneously toward and away from each other by a threaded shaft 44. The shaft 44 may be rotated by a hand wheel 46. The shearing device 25 and clamping device 41 are secured to a movable carriage 47. The carriage 47 is mounted slidably on a pair of guide members 48—48. The opposite ends of a wire rope 49 are secured to opposite ends of the carriage 47 and an intermediate portion of the rope 49 is wrapped around a capstan 51. The capstan 51 is driven by a motor 52 to move the carriage 47 back and forth along the guide members 48—48.

The cutting device 40 is actuated to sever circumferentially only the lead sheath and not the conductors in the core of the cable 10. The cutting device 40 is mounted on a carrier 53 for adjustable movement longitudinally of the cable 10, and includes a hollow gear 55 mounted rotatably partially within a substantially U-shaped bearing 56. The gear 55 has a U-shaped slot 57 therein for permitting the cable 10 to be inserted into the cutting device 40. A U-shaped bushing 60 may be inserted in the slot 57 to accommodate cables 10—10 of different sizes. The gear 55 is driven by a motor 58 through a gear reducer 59 and a plurality of gears 61 and 62—62 (see Fig. 2). Because of the slot 57 in the gear 55, it is necessary that the gears 62—62 be spaced sufficiently far apart to permit one of the gears 62—62 to drive the gear 55 while the other is adjacent to the slot 57.

Referring now to Figs. 2 and 3, a sheath-cutting mechanism, designated generally by the numeral 65, forms a portion of the cutting device 40 and is secured within the gear 55. The cutting mechanism 65 includes a pair of cooperating cutters, designated generally by the numerals 66—66, which are similar in structure. Each cutter 66 includes a pair of cutting rollers 67—67 secured rotatably to an arm 68 which, in turn, is mounted pivotally within a bifurcated bar 69. Each of the bifurcated bars 69—69 is mounted pivotally about a pin 70 on the gear 55; each of the pins 70—70 also connects the associated bar 69 to a bifurcated member 71 which, in turn, is attached to an arm 72. Two plates 73—73 having threaded portions 75—75 therein are positioned in a slot in each of the bars 69—69 and secured pivotally therein by a pin 74. A threaded shaft 76 is secured rotatably within each of the arms 72—72 and extends between the associated arm 72 and plates 73—73.

The arms 72—72 are secured pivotally, by pins 77—77, to a snap-action toggle joint mechanism, designated generally by the numeral 78. The toggle point mechanism 78 is formed by linkages 79—79 being secured adjacent to one end of a shaft 80 by a pin 84. A cam follower 81 (Fig. 3) is secured to the opposite end of the shaft 80. The desired positions of the adjustable cutting rollers 67—67 are dependent upon the size of the sheathed cable 10 to be cut. Screws 82—82 normally cause the plates 73—73 to clamp the threaded shafts 76—76. Turning the screws 82—82 to loosen the plates 73—73 permits the threaded shafts 76—76 to rotate along the threaded portion of the plates 73—73 by turning adjusting knobs 64—64 on the ends of the shafts 76—76. The rotation of each of the threaded shafts 76—76 causes the associated bar 69 to pivot about the associated pin 70 to cause the associated cutting rollers 67—67 to be positioned in predetermnied positions, as determined by an associated calibrated projecting plate 83. The plates 73—73 will pivot about the associated pin 74 to compensate for the arcuate movement of the bar 69.

As the sheath-cutting mechanism 65 is rotated, in a counterclockwise direction, as viewed in Fig. 2, the cam follower 81 (see Fig. 3) comes in contact with a fixed cam 84 which forces the follower 81 towards the center of the cable 10 and causes a snapping action of the toggle joint mechanism 78. This action causes the linkages 79—79 to force the lower ends of the arms 72—72 outwardly further away from the shaft 80 than the position shown in Figure 2. Since the bars 69—69 are secured pivotally to the pins 70—70, the cutting rollers 67—67 are urged into contact with the sheath of the cable 10 and are caused to cut therethrough. After the hollow gear 55 has been rotated approximately an additional 180°, the cam follower 81 contacts a second fixed cam 86 which forces the follower 81 back into its original, relative, radial position so that the cutting rollers 67—67 are removed from the sheath of the cable 10. The arms 68—68 are caused to pivot about pins 87—87 by means of associated counterweights 88—88, secured to the arms 68—68 so that the upper rollers 67—67 will move outwardly and thus permit a subsequent section of cable 10 to be inserted in the cutting device 40.

*Operation*

The relatively stiff, lead-sheathed cable 10 having a plurality of conductors therein is placed manually through rollers 11—11 over the roller 12 and the supporting roller 13 which has been adjusted vertically by the hand wheel 17. The cable 10 is passed from the supporting roller 13 through the shearing device 25 and secured to the winding drum 26 by a gripping chain device (not shown). After the cable 10 has been secured to the drum 26, the drum is rotated by energizing the motor 24. When a predetermined length of the cable 10, as determined by the measuring device 22, is wound upon the drum 26, the drum 26 is stopped by the control of the device 22. The cable 10 is then severed by activating the shearing device 25, and the arm 34 is rotated in a counterclockwise direction to the position illustrated by the solid lines in Fig. 1. The end of the cable 10 extending from the drum 26 is supported by the sheath-cutting device 40, secured to the carriage 53 in a predetermined position, and by the clamping device 41, secured to the movable carriage 47.

The gear 55 and thus the sheath-cutting device 40 is rotated to sever only the lead sheath around the conductors and not the conductors themselves. When the gears 55 and 61 have completed one revolution, a cam 89 secured to and revolved by the gear 61 actuates a switch 90 to deenergize the motor 58. After the cable sheath has been cut circumferentially thereof by the cutting mechanism 65 of the cutting device 40, the severed sheath is stripped from the cable 10 by moving the carriage 47 and the cable clamping device 41 to the left as viewed in Fig. 1. The coiled portion of the cable 10 is removed from the apparatus in preparation for a subsequent coiling, shearing, cutting and stripping operation.

It is to be understood that the above-described arrangements are simply illustrative of the principles of the invention. Other arrangements may be devised by those skilled in the art which will embody the principles of the invention and fall within the spirit and scope thereof.

What is claimed is:

1. In apparatus including means for coiling a sheathed cable containing a core, means for shearing the sheath and cable core, and means for stripping a portion of the sheath from the cable adjacent to one end thereof, an improved means for cutting the sheath circumferentially, which comprises a pair of pivotally mounted bars having free ends thereof adjustable toward and away from each other and a portion of the cable positioned therebetween, said bars being designed to be revolved around the cable, a pair of arms, the arms being mounted pivotally at an intermediate portion thereof adjacent to the free ends of the bars, cutting rollers mounted rotatably adjacent to each end of each of the pivoted arms adjacent to the sheath to be cut and on opposite sides thereof, weights secured to the arms to cause adjacent ends thereof to move apart to permit insertion of the cable therebetween, a toggle joint mechanism connected arms and the cutting rollers around the portion of the cable therebetween, a toggle point mechanism connected adjacent to the opposite ends of the bars, and cam means for causing the arms to pivot with a snapping toggle action during a portion of the revolution of the cutting rollers around the cable so that the cutting rollers sever the cable sheath and are retracted therefrom in a single revolution of the cutting rollers around the cable.

2. In apparatus including means for coiling a sheathed cable containing a core, means for shearing the sheath and cable core, and means for stripping a portion of the sheath from the cable adjacent to one end thereof, an improved means for cutting the sheath circumferentially, which comprises a pair of pivotally mounted bars having free ends thereof adjustable toward and away from each other and a portion of the cable positioned therebetween, said bars being designed to be revolved around the cable, a pair of arms, the arms being mounted pivotally at an intermediate portion thereof adjacent to the free ends of the bars, cutting rollers mounted rotatably adjacent to each end of each of the pivoted arms, adjacent to the sheath to be cut and on opposite sides thereof, means for adjusting the spacing of the free ends of the arms to accommodate cables of different sizes and sheaths of different thicknesses, means for revolving the bars, the arms and the cutting rollers around the portion of the cable therebetween, a toggle joint mechanism connected adjacent to the opposite ends of the bars, and cam means for causing the arms to pivot with a snapping toggle action during a portion of the revolution of the cutting rollers around the cable so that the cutting rollers sever the cable sheath and are retracted therefrom in a single revolution of the cutting rollers around the cable.

3. In apparatus including means for coiling a sheathed cable containing a core, means for shearing the sheath and cable core, and means for stripping a portion of the sheath from the cable adjacent to one end thereof, an improved means for cutting the sheath circumferentially, which comprises a pair of pivotally mounted bars having free ends thereof adjustable toward and away from each other and a portion of the cable positioned therebetween, said bars being designed to be revolved around the cable, a pair of arms, the arms being mounted pivotally at an intermediate portion thereof adjacent to the free ends of the bars, cutting rollers mounted rotatably adjacent to each end of each of the pivoted arms, adjacent to the sheath to be cut and on opposite sides thereof, a calibrated gauge secured to the arms, means for adjusting the spacing of the free ends of the arms to accommodate cables of different sizes and sheaths of different thicknesses, a weight secured to each of the arms to cause outer adjacent ends thereof to pivot away from each other to permit insertion of the cable therebetween, means for revolving the bars, the arms and the cutting rollers around the portion of the cable therebetween, a toggle joint mechanism connected adjacent to the opposite ends of the bars, and cam means for causing the arms to pivot with a snapping toggle action during a portion of the revolution of the cutting rollers around the cable so that the cutting rollers sever the cable sheath and are retracted therefrom in a single revolution of the cutting rollers around the cable.

References Cited in the file of this patent

UNITED STATES PATENTS

| | | |
|---|---|---|
| 1,728,504 | Nonneman | Sept. 17, 1929 |
| 1,784,298 | Mahan et al. | Dec. 9, 1930 |
| 2,373,472 | Haumiller | Apr. 10, 1945 |
| 2,456,882 | Mackey | Dec. 21, 1948 |
| 2,589,471 | Ayers et al. | Mar. 18, 1952 |

UNITED STATES PATENT OFFICE
CERTIFICATE OF CORRECTION

Patent No. 2,981,129 April 25, 1961

George P. Adams

It is hereby certified that error appears in the above numbered patent requiring correction and that the said Letters Patent should read as corrected below.

Column 4, line 58, for "a toggle joint mechanism connected" read -- means for revolving the bars, the --; line 60, for "point" read -- joint --.

Signed and sealed this 3rd day of October 1961.

(SEAL)
Attest:

ERNEST W. SWIDER
Attesting Officer

DAVID L. LADD
Commissioner of Patents

USCOMM-DC